US007577602B2

(12) United States Patent
Singer

(10) Patent No.: US 7,577,602 B2
(45) Date of Patent: Aug. 18, 2009

(54) METHOD AND INTERFACE FOR CONSOLIDATING PRICE LEVELS ON A TRADING SCREEN

(75) Inventor: Scott Singer, Lake Bluff, IL (US)

(73) Assignee: Trading Technologies International Inc., Chicago, IL (US)

(*) Notice: Subject to any disclaimer, the term of this patent is extended or adjusted under 35 U.S.C. 154(b) by 1442 days.

(21) Appl. No.: 10/304,248

(22) Filed: Nov. 26, 2002

(65) Prior Publication Data

US 2004/0103054 A1 May 27, 2004

(51) Int. Cl.
G06F 17/60 (2006.01)
(52) U.S. Cl. .......................................... 705/37; 705/39
(58) Field of Classification Search .............. 705/35–45
See application file for complete search history.

(56) References Cited

U.S. PATENT DOCUMENTS

| | | | |
|---|---|---|---|
| 4,674,044 A | 6/1987 | Kalmus | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman | |
| 5,101,353 A | 3/1992 | Lupien | |
| 5,136,501 A | 8/1992 | Silverman et al. | |
| 5,270,922 A | 12/1993 | Higgins | |
| 5,297,031 A | 3/1994 | Gutterman | |
| 5,297,032 A | 3/1994 | Trojan | |
| 5,689,651 A | 11/1997 | Lozman | |
| 5,752,025 A * | 5/1998 | Shakib et al. | 707/102 |
| 5,768,158 A | 6/1998 | Adler et al. | |
| 5,774,877 A | 6/1998 | Patterson | |
| 5,793,301 A | 8/1998 | Patterson | |
| 5,797,002 A | 8/1998 | Patterson | |
| 5,845,266 A | 12/1998 | Lupien | |
| 5,915,245 A | 6/1999 | Patterson | |
| 5,924,082 A | 7/1999 | Silverman | |
| 5,924,083 A | 7/1999 | Silverman | |
| 5,946,667 A | 8/1999 | Tull | |
| 5,963,923 A | 10/1999 | Garber | |
| 6,012,046 A | 1/2000 | Lupien | |
| 6,014,643 A | 1/2000 | Minton | |
| 6,035,287 A | 3/2000 | Stallaert | |

(Continued)

FOREIGN PATENT DOCUMENTS

EP  1067471 A1  1/2001

(Continued)

OTHER PUBLICATIONS

International Search Report for PCT/US03/37748.

(Continued)

Primary Examiner—Susanna M Diaz
Assistant Examiner—Stephanie Ziegle
(74) Attorney, Agent, or Firm—McDonnell Boehnen Hulbert & Berghoff LLP

(57) ABSTRACT

A trading screen may display price and quantity information for price levels in a static axis of prices. The static axis of prices may be divided into two or more different regions. The price and quantity information for one or more of the regions may be consolidated from price and quantity information from plurality of un-consolidated price levels.

7 Claims, 6 Drawing Sheets

U.S. PATENT DOCUMENTS

| | | | |
|---|---|---|---|
| 6,098,051 A | 8/2000 | Lupien | |
| 6,131,087 A | 10/2000 | Luke | |
| 6,134,535 A | 10/2000 | Belzberg | |
| 6,195,647 B1 | 2/2001 | Martyn | |
| 6,260,025 B1 | 7/2001 | Silverman et al. | |
| 6,272,474 B1 | 8/2001 | Garcia | |
| 6,278,982 B1 * | 8/2001 | Korhammer et al. | 705/36 R |
| 6,282,521 B1 | 8/2001 | Howorka | |
| 6,408,282 B1 | 6/2002 | Buist | |
| 6,766,304 B2 | 7/2004 | Kemp | |
| 6,772,132 B1 * | 8/2004 | Kemp et al. | 705/36 R |
| 7,127,424 B2 * | 10/2006 | Kemp et al. | 705/37 |
| 7,181,424 B1 * | 2/2007 | Ketchum et al. | 705/37 |
| 2001/0037284 A1 | 11/2001 | Finkelstein et al. | |
| 2002/0023038 A1 | 2/2002 | Fritsch | |
| 2002/0035534 A1 | 3/2002 | Buist | |
| 2002/0052816 A1 | 5/2002 | Clenaghan et al. | |
| 2002/0055899 A1 | 5/2002 | Williams | |
| 2002/0059129 A1 | 5/2002 | Kemp | |
| 2002/0099644 A1 | 7/2002 | Kemp | |
| 2002/0120547 A1 * | 8/2002 | Zajac | 705/37 |
| 2002/0120551 A1 | 8/2002 | Jones | |
| 2002/0138401 A1 | 9/2002 | Allen | |
| 2002/0184237 A1 | 12/2002 | McFeely et al. | |
| 2003/0004853 A1 | 1/2003 | Ram | |
| 2003/0009411 A1 | 1/2003 | Ram | |
| 2003/0023542 A1 | 1/2003 | Kemp | |
| 2006/0167781 A1 | 7/2006 | Kemp, II et al. | |
| 2006/0195387 A1 | 8/2006 | Kemp, II et al. | |

FOREIGN PATENT DOCUMENTS

| | | | |
|---|---|---|---|
| WO | WO9114231 A1 | 9/1991 | |
| WO | WO95/26005 A1 | 9/1995 | |
| WO | WO9849639 A1 | 11/1998 | |
| WO | WO9919821 A1 | 4/1999 | |
| WO | WO99/30259 A1 | 6/1999 | |
| WO | WO9953424 A1 | 10/1999 | |
| WO | WO00/52619 A1 | 9/2000 | |
| WO | WO00/62187 A2 | 10/2000 | |
| WO | WO00/62187 A3 | 10/2000 | |
| WO | WO00/65510 A1 | 11/2000 | |
| WO | WO01/16830 A1 | 3/2001 | |
| WO | WO01/16852 A2 | 3/2001 | |
| WO | WO01/22315 A2 | 3/2001 | |
| WO | WO 01/65403 A2 * | 9/2001 | |
| WO | WO0165403 A2 | 9/2001 | |
| WO | WO01/88808 A1 | 11/2001 | |
| WO | WO02/15461 A2 | 2/2002 | |
| WO | WO0229686 A1 | 4/2002 | |
| WO | WO02/48945 A1 | 6/2002 | |
| WO | WO 02/059815 | 8/2002 | |
| WO | WO02/059815 A1 | 8/2002 | |
| WO | WO 02/069226 | 9/2002 | |
| WO | WO02/069226 A2 | 9/2002 | |
| WO | WO 02/079940 | 10/2002 | |
| WO | WO02/079940 A2 | 10/2002 | |
| WO | WO03090032 A2 | 10/2003 | |
| WO | WO03090032 A3 | 10/2003 | |

OTHER PUBLICATIONS

USPTO Presentation, NASDAQ, Nov. 8, 2001.
Kharouf, A Trading Room with a View, Futures, 27, Nov. 11, 1998.
www.tradingtechnologies.com/productsixtrade_full.html (May 22, 2001).
International Search Report for PCT/US03/37748 (Jun. 28, 2006).

* cited by examiner

| Working Orders 106 | Bid Qty 104 | Ask Qty 102 | Price 100 |
|---|---|---|---|
| | | 0 | 107100 |
| | | 11 | 107075 |
| | | 5 | 107050 |
| | | 0 | 107025 |
| | | 12 | 107000 |
| | | 23 | 106975 |
| | | 68 | 106950 |
| | | 47 | 106925 |
| | | 125 | 106900 |
| | 123 | | 106875 |
| | 67 | | 106850 |
| | 111 | | 106825 |
| | 24 | | 106800 |
| | 14 | | 106775 |
| | 26 | | 106750 |
| | 0 | | 106725 |
| | 4 | | 106700 |
| | 0 | | 106675 |

FIG. 1

| Working Orders 106 | Bid Qty 104 | Ask Qty 102 | Price 100 |
|---|---|---|---|
| | | 115 | 107550 |
| | | 53 | 107450 |
| | | 11 | 107350 |
| | | 13 | 107250 |
| | | 28 | 107150 |
| | | 23 | 107050 |
| | | 68 | 107000 |
| | | 47 | 106950 |
| | | 125 | 106900 |
| | 123 | | 106850 |
| | 67 | | 106800 |
| | 111 | | 106750 |
| | 24 | | 106700 |
| | 44 | | 106500 |
| | 27 | | 106300 |
| | 15 | | 106100 |
| | 7 | | 105900 |
| | 33 | | 105700 |

FIG. 4

| Working Orders 106 | Bid Qty 104 | Ask Qty 102 | Price 100 |
|---|---|---|---|
| | | 121 | 107675 |
| | | 168 | 107475 |
| | | 11 | 107275 |
| | | 35 | 107175 |
| | | 28 | 107075 |
| | | 23 | 106975 |
| | | 68 | 106950 |
| | | 47 | 106925 |
| | | 125 | 106900 |
| | 123 | | 106875 |
| | 67 | | 106850 |
| | 111 | | 106825 |
| | 24 | | 106800 |
| | 40 | | 106750 |
| | 4 | | 106700 |
| | 15 | | 106650 |
| | 12 | | 106600 |
| | 3 | | 106550 |

FIG. 5

METHOD AND INTERFACE FOR CONSOLIDATING PRICE LEVELS ON A TRADING SCREEN

FIELD OF THE INVENTION

The present invention relates generally to electronic trading. More specifically, it relates to a method for displaying trading information.

BACKGROUND OF THE INVENTION

Many exchanges throughout the world now support electronic trading. Generally, an electronic exchange provides a matching process between traders, or simply buyers and sellers. Some well known exchanges include Eurex, London International Financial Futures Exchange ("LIFFE"), Euronext, Chicago Mercantile Exchange ("CME"), Chicago Board of Trade ("CBOT"), Xetra, and Island. Traders are typically connected to an electronic exchange by way of a communication link to facilitate electronic messaging between the trader and the exchange.

For instance, the trader might submit buy or sell orders to an electronic exchange and later obtain status or fill information from the exchange. Among other things, ease of submitting buy or sell orders has made electronic exchanges a successful venue for trading. Accordingly, an increasing number of people across the world are actively participating in a market at any given time. The increase in the number of potential market participants has advantageously led to, among other things, a more competitive market and greater liquidity.

A trader can connect to an exchange, for example, using a client device, and the exchange can serve as a host. Once connected, software running on the client allows the trader to log onto one or more exchanges and participate in one or more markets. Some clients run software that creates specialized interactive trading screens. In general, the trading screens enable traders to enter orders into the market, obtain market quotes, and monitor positions. The range and quality of features available varies according to the specific trading application.

One such feature generally displayed by a trading screen is the current market depth, which includes a number of price levels and the outstanding bid or ask quantities corresponding to the price levels. While the market may include outstanding bid and ask quantities at a multitude of different price levels, the trading screen may not be physically large enough to accommodate displaying all of the different price levels and their outstanding bid or ask quantities. Thus, a trading screen typically displays a range of price levels around the inside market.

Displaying a small range of price levels around the inside market, however, may provide a trader with a narrow view of the market. The trader may view the market depth around the inside market, but the trader may not be able to see the outstanding market depth at price levels further away from the inside market. This problem may be accentuated depending on the "tick" size used by the market or the client software. A tick generally refers to the smallest tradeable price level graduation in the market.

A market may use any measure for a tick. For example, a tick may represent a fraction of a dollar or another currency, or a tick may represent a decimal portion of a dollar or another currency. When displaying smaller ticks, the trading screen displays an increasingly narrow view of the current market. For example, using a graduation of one cent, a trader may only be able to see price levels a few cents away from the inside market. The market, however, may have bids and asks outstanding over a range of several dollars away from the inside market, but the trader may not be able to see these other outstanding bids and asks due to the narrow range of price levels within the viewable area of the trading screen.

In the following detailed description, a trading application and trading interface for displaying consolidated price and quantity information are described. These tools provide advantages, as described below, to a trader in an electronic trading environment.

BRIEF DESCRIPTION OF THE DRAWINGS

The presently preferred embodiments of the present invention are described herein with reference to the drawings, in which:

FIG. 1 is a trading screen configurable for two or more display regions in which at least one of the display regions uses consolidation;

FIG. 4 is a preferred embodiment of the trading screen of FIG. 1 configured for three display regions in which each of the display regions use consolidation and in which each of the display regions uses a different consolidation scale;

FIG. 5 is a preferred embodiment of the trading screen of FIG. 1 configured for four display regions in which three of the display regions use consolidation.

DETAILED DESCRIPTION OF THE PRESENTLY PREFERRED EMBODIMENTS

Figure 2:
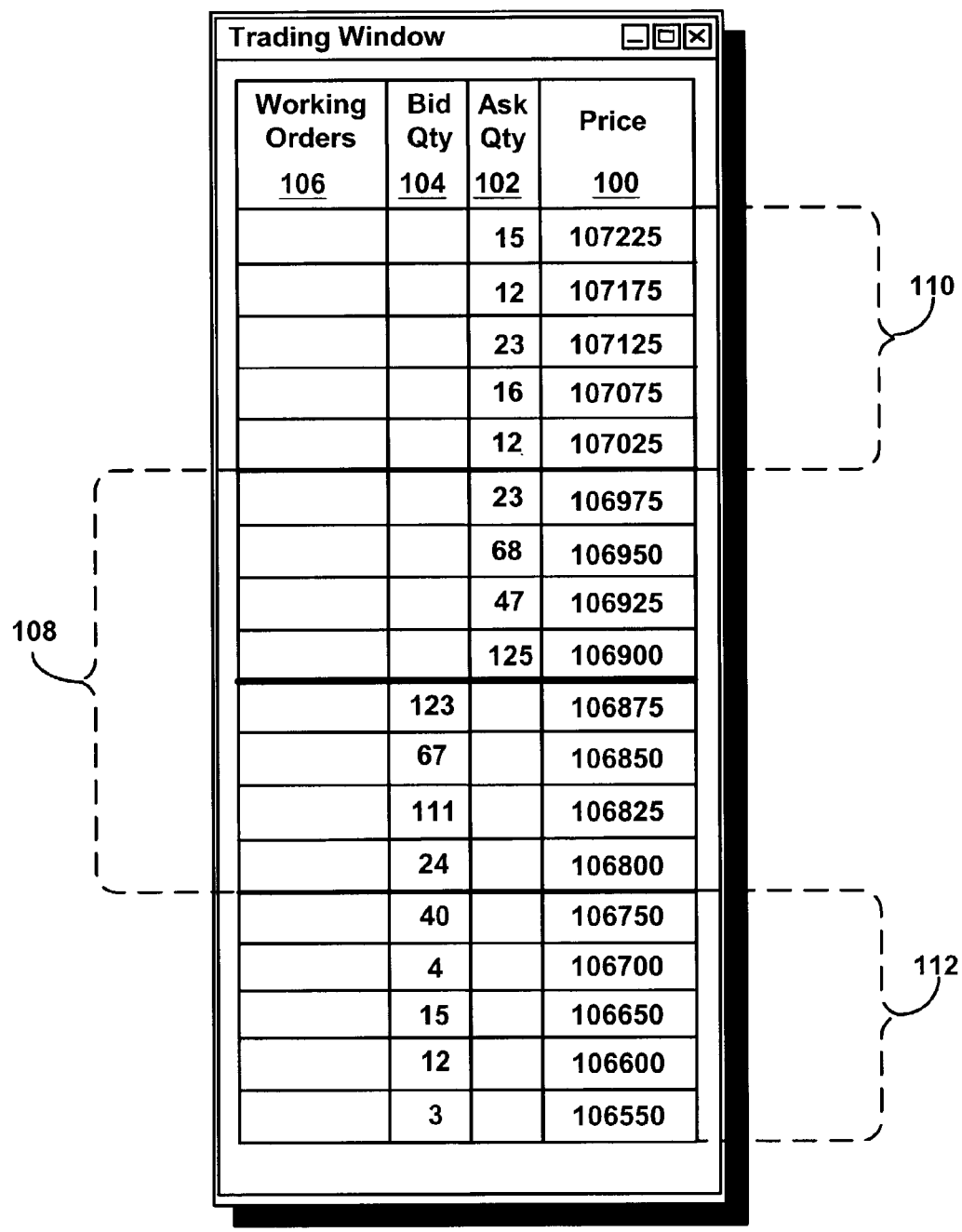
FIG. 2 is a preferred embodiment of the trading screen of FIG. 1 configured for three display regions in which two of the display regions use consolidation with the same consolidation scale.

Many different exchanges support electronic trading. Electronic trading allows a trader to interact with the exchanges from a remote location, such as by using a computer connected to the exchanges over one or more computer networks. Once connected to an exchange, the trader may receive market information about tradeable objects that are traded on the exchange. The trader may additionally trade the tradeable objects, such as by entering buy or sell orders.

A tradeable object can be any object, such as stocks, options, bonds, futures, currency, warrants, funds, or other financial objects. Other objects, for example, grains, energy and metals can also be traded. Of course, these lists are not exhaustive, and any other object for which there exists a market can be traded. Tradeable objects can be "real," such as products that are listed by an exchange for trading, or they can by "synthetic," such as a combination of real products that is created by a trader, firm, broker or the like. Of course, a tradeable object could actually be a combination of other tradeable objects, such as a class of tradeable objects.

Electronic trading exchanges are generally based on one or more hosts, one or more computer networks, and a plurality of clients. In general, the host includes one or more centralized computers. Its operations may include order matching, maintaining order books and positions, price information, and managing and updating, for example a database, that records such information. The host may also be equipped with an external interface that maintains uninterrupted contact to the clients and possibly other trading-related systems.

Market participants may link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 line or an Integrated Digital Services Network ("ISDN") connection. When connecting through a direct connection, a market participant may connect through one or more common network components such as high-speed servers, routers, and gateways, and so on. Of course, a market participant may also connect to the exchange through the Internet or another type of network.

A method, system and interface for electronic trading with an exchange is described in U.S. patent application Ser. No. 09/590,692, filed Jun. 9, 2000, entitled "Click Based Trading with Intuitive Grid Display of Market." This application is commonly assigned to Trading Technologies International, Inc., and it is incorporated herein by reference in its entirety. This application describes network topologies, interfaces and general trading functionality and techniques that may be used in implementing the preferred embodiments described herein.

Once connected to an exchange, a trading application may use trading screens to enable a trader to interact with one or more markets. Trading screens may enable traders to enter and cancel orders, obtain market information, and monitor positions while implementing various trading strategies including those previously used on the floor of an exchange. For example, using the trading screen a trader may receive information about tradeable objects traded on the exchange. Additionally, the trader may use the trading screen, for example, to place buy and sell orders for the tradeable objects or to otherwise trade the tradeable objects.

The trading application may receive information from the exchange, which can in turn be displayed to the trader. For example, the trading application may receive a list of tradeable objects traded on the exchange. Additionally, the trading application may receive market information for each tradeable object, such as bid prices, bid quantities, ask prices, ask quantities, and additionally, some exchanges provide prices and quantities for past sales, and other market related information. The information may be continuously or regularly provided to the trading application, which allows the trading application to update the trading screen with current market information.

Using the information provided by the exchange, the trading screen may display a range of price levels and corresponding bid and ask quantities for the price levels in regard to tradeable objects. Oftentimes, however, the physical display size of the trading screen is limited, and the trading screen is unable to display all the different price levels and their corresponding bid or ask quantities. In order to provide the trader with pertinent trading information, the trading screen may display a range of prices around the inside market. The trading screen may also display the bid and ask quantities corresponding to these price levels.

The market, however, may have a number of other price levels with outstanding bid or ask quantities that are not displayed in the range around the inside market. As these price levels and quantities are not displayed, the trader cannot view this information. Thus, the trader may only view a narrow range of price levels and corresponding quantities around the inside market but not see trading information displayed at price levels further away from the inside market. This problem may be further accentuated based on the tick size for the market. As the tick size decreases, the trader sees an increasingly narrow view of the market. Also, as the tick size decreases, the trader may be more willing to trade at price levels further away from the inside market, because the change in price levels may then only correspond to a small change in the actual price of the tradeable object. Thus, it may be advantageous for the trader to view the market depth at price levels further away from the inside market.

One way to enhance a trading screen's display of the current market depth is through price consolidation. One such trading screen that implements price consolidation is described in U.S. patent application Ser. No. 09/971,087, entitled "Click Based Trading With Intuitive Grid Display of Market Depth and Price Consolidation," filed on Oct. 5, 2001. This application is commonly assigned to Trading Technologies International, Inc., and it is incorporated herein by reference in its entirety.

In price consolidation, two or more price levels may be combined into a single "consolidated" price level. The outstanding bid or ask quantity of the consolidated price level may then be the sum of the outstanding quantities of the unconsolidated price levels combined to form the consolidated price level. Using price consolidation, a trading screen may then display information from a greater number of price levels on the trading screen than it would be able to if it did not use price consolidation. The methods and displays described in "Click Based Trading With Intuitive Grid Display of Market Depth and Price Consolidation" allow a trader to advantageously use price consolidation to view outstanding quantities over a greater range of price levels.

"Click Based Trading With Intuitive Grid Display of Market Depth and Price Consolidation" describes a method of price consolidation where the number of un-consolidated price levels combined to form a consolidated price level may vary, but each price level is formed from the same number of un-consolidated price levels as the other consolidated price levels. For example, if each consolidated price level were formed from two un-consolidated price levels, the trading screen would be able to display information for twice the number of price levels as a trading screen that did not use price consolidation.

That application also describes exemple equations that can be used in consolidating price levels. In addition to the equations described in that application, the following definitions and equations, which provide improved handling of negative prices, can also be used:

P=Price (in ticks)
N=Variable increment chosen by the trader (number of ticks per consolidated price)
Bcp=Consolidated price row with corresponding bid quantity (in ticks)
Acp=Consolidated price row with corresponding ask quantity (in ticks)
Floor=Floor function
Os=Offset (# ticks)
Bcp=Floor((P−Os)/N)N+Os
Acp=Floor(((P−Os)+N−1)/N)N+Os As the trader may want to place orders at the price levels close to the inside market, it may be important to the trader to have a higher resolution closer to the inside market or even to view un-consolidated quantities near the inside market. Additionally, the trader may want to place orders closer to the inside market by using an increased consolidation price level resolution or even to place orders by specifying specific unconsolidated price levels. At the same time, the trader may want to use price consolidation to view information at price levels further away from the inside market than could be displayed on a trading screen that didn't use price consolidation.

While the "Click Based Trading With Intuitive Grid Display of Market Depth and Price Consolidation" application describes a method for advantageously applying price consolidation to all the price levels of a trading screen, it would be still more advantageous to provide the trader with a method of price consolidation that allows the trader to have a high resolution near the inside market (or other arbitrarily define area) while still using price consolidation to view a greater number of price levels on the trading screen, such as those further away from the inside market. One way to allow the trader to increase the resolution closer to the inside market while still using price consolidation to view information for price levels further away from the inside market is to use a trading screen having two or more display regions using different consolidation resolutions.

FIG. 1 is a trading screen configurable for two or more display regions in which at least one of the display regions uses consolidation. The trading screen of FIG. 1 may be used, for example, to increase the resolution at an area surrounding the inside market, while still using price consolidation to allow the trader to view information from price levels further away from the inside market.

As shown in FIG. 1, the trading screen includes a price column 100, which may be used to display a range of price levels for a tradeable object. As depicted in FIG. 1, each of the price levels displayed in the price column 100 corresponds to one tick. Thus, the price levels shown in FIG. 1 are unconsolidated, and they represent the smallest graduation of price levels tradeable in the market.

The trading screen also includes an ask quantity column 102 and a bid quantity column 104. The ask quantity column 102 displays current ask quantities at various different price levels. The bid quantity column 104 displays current bid quantities at various different price levels. Thus, the ask quantity column 102 and the bid quantity column 104 display the current market depth. The bid and ask quantities in the bid and ask quantity columns 102, 104 may be displayed using any type of indicator. For example, the indicator may be graphical representation of quantity (e.g., colors, bars, etc . . . ), or the indicator may be a textual representation of quantity, such as a number. Various combinations of indicators may also be used, for example, a text representation in combination with a color.

As depicted in FIG. 1, the outstanding bid quantities and ask quantities are displayed in association with price levels arranged along a common static axis or scale of prices. The price levels are fixed in relation to the bid and ask quantity columns 102, 104, such that the indicators in these columns 102, 104 may move relative to the static axis of prices. For example, the bid and ask quantities displayed by the trading screen may change, and the inside market may move away from the price level depicted in FIG. 1. While the trading application may update the quantities, and while the position of the inside market may change, the range of price levels displayed in the price column 100 and the respective positions of the price levels displayed in the price column 100 may remain fixed.

It should be noted that the static axis of prices is not necessarily immovable with respect its physical position on the display screen, but rather may be moved to various different positions on the display. The user may use a mouse or other input device, for example, to reposition static axis of prices to a different location on the display screen, such as by dragging the static axis of prices from one side of the display screen to the other side of the display screen. In another example, the user may vary which portion of the static axis of prices is displayed, such as by scrolling up or down the axis or by entering a repositioning command.

One commercially available trading application that allows a user to trade in an electronic trading environment, and which may be used in the preferred embodiments, is X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. It should be understood, however, that the preferred embodiments are not limited to any particular display, such as X_TRADER® or MD Trader™-style displays, but may be used with a variety of different display types.

Portions of the X_TRADER® and the MD Trader™-style display are described in the previously referenced applications. Moreover, the trading application may implement tools for trading tradeable objects that are described in a U.S. patent application Ser. No. 10/125,894, titled "Trading Tools for Electronic Trading," and filed Apr. 19, 2002. This application is commonly assigned to Trading Technologies International, Inc., and it is incorporated by reference herein in its entirety.

The trading screen may also include a variety of other columns, which may be used to display other information to a trader. For example, as depicted in FIG. 1, the trading screen includes a working orders column 106 that may be used to display orders placed by a trader at a price level that have not yet been matched in the market. The working order column 106 is merely one example, and many other columns may be displayed in addition to the working order column 106 or in place of the working order column 106.

Other changes may also be made. In a preferred embodiment, as shown in FIG. 1, the trading screen displays a static price column 100 and the ask and bid quantities are displayed with respect to the static axis of prices. In an alternate embodiment, the ask and bid quantities may be displayed with respect to a static axis of prices, but the price column 100 is not actually displayed. In yet another alternate embodiment, the price column 100 may be dynamically displayed so that the inside market remains centered at a position in the trading screen's display. In another alternate embodiment, one or both of the quantities columns 102, 104 may be omitted from the display.

Additionally, the orientation of the trading screen may be altered. For example, while FIG. 1 depicts the columns 100, 102, 104, 106 in a vertical orientation, they may alternatively be arranged in a horizontal orientation. In yet another alternate embodiment, the columns 100, 102, 104, 106 may be arranged in an oblique orientation or using another type of display format. In yet another alternate embodiment, the order of the columns 100, 102, 104, 106 may be rearranged. In another alternate embodiment, two or more of the columns 100, 102, 104, 106 may overlap.

The trading screen of FIG. 1 may be configured to display two or more different display regions, which may be sub-regions of the price column 100. The display regions may be used to display the un-consolidated price levels of FIG. 1, or they may display consolidated price levels formed by combining two or more of the un-consolidated price levels of FIG. 1. In a preferred embodiment, at least one of the display regions displays un-consolidated price levels, while one or more other display regions display consolidated price levels.

In another preferred embodiment, all of the display regions display consolidated price levels, and the display regions may use different consolidation scales.

FIG. 2 is a preferred embodiment of the trading screen of FIG. 1 configured for three display regions in which two of the display regions use consolidation with the same consolidation scale. As shown, a first display region 108 is centered with respect to the range of price levels displayed in the price column 100. The first display region 108, however, is not confined to being centered with respect to the price column 100. It may be offset from the center of the price level range, it may be offset from the inside market, or it may not include the inside market at all. As depicted in FIG. 1, the first display region 108 includes the inside market, and the trading screen does not coalesce price levels in the first display region 108. This allows the trader to view the price levels near the inside market with the greatest precision. In alternate embodiments, and as will be described later, the first display region 108 may also consolidate price levels.

The trading screen of FIG. 2 further includes a second display region 10 and a third display region 112. As shown in FIG. 2, the second display region 110 is generally located above the first display region 108, and the third display region 112 is generally located below the first display region 108. It should be understood, however, that the described locations of the first, second and third display regions 108, 110, 112 are merely arbitrary in nature, and their respective locations on a trading screen may be varied.

The second and third display regions 110, 112 may each respectively include consolidated price levels, which may be formed by combining two or more adjacent price levels into a single price level. As shown in FIG. 2, the consolidated price levels in the second and third display regions 110, 112 are each formed by consolidating two of the price levels in the trading screen of in FIG. 1. The price levels in the second and third display regions 110, 112, however, may be formed by consolidating more than two price levels, thereby changing the scale of the second or third display regions 110, 112. By consolidating price levels in the second and third display regions 110, 112, the trading screen may display information from more unconsolidated price levels while still displaying the same number of physical price levels on the trading screen. This may advantageously allow a trader to view market information for price levels further away from the inside market. Various changes, such as the number of regions or their consolidation scales, may also be made.

Figure 3:
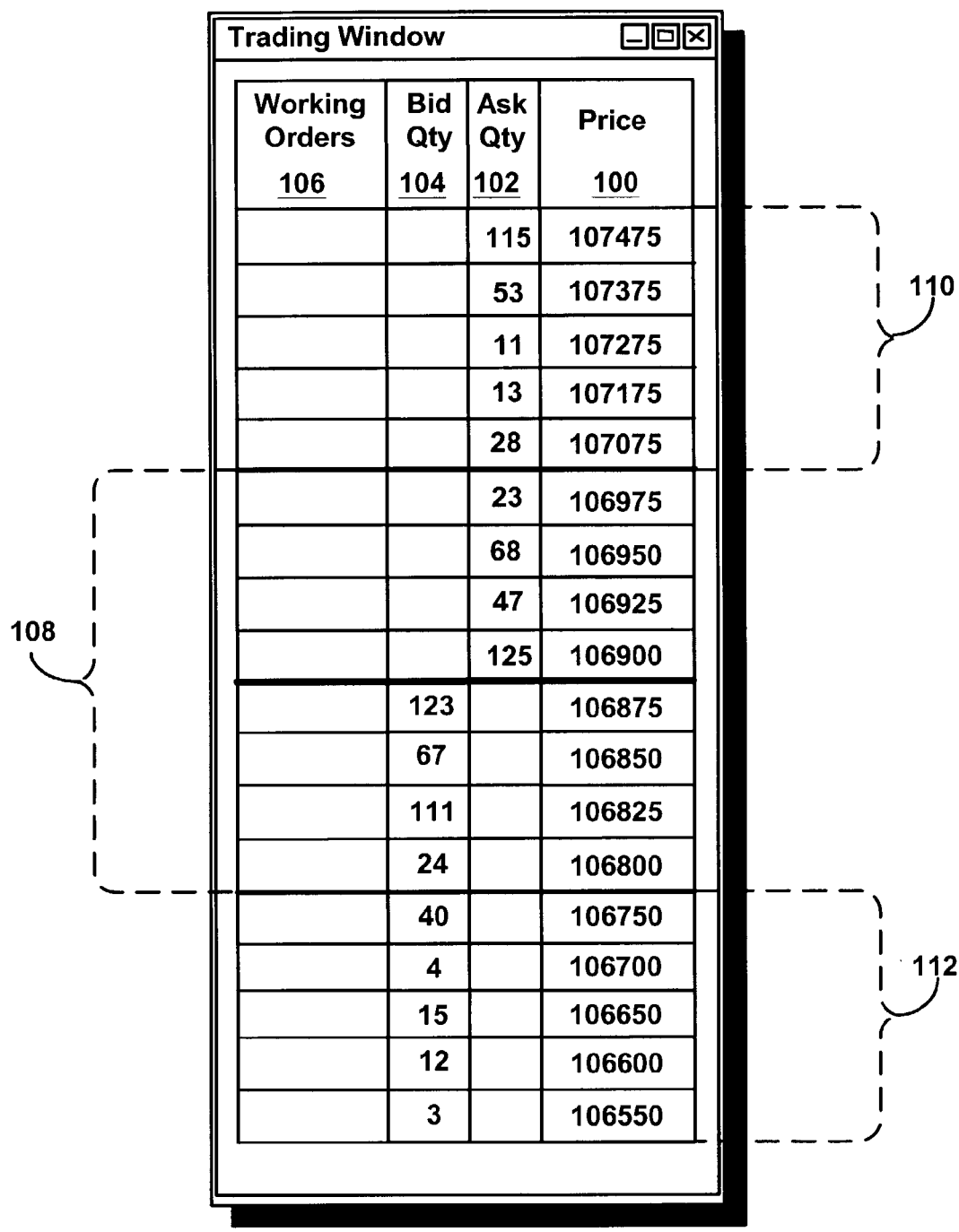
FIG. 3 is a preferred embodiment of the trading screen of FIG. 1 configured for three display regions in which two of the display regions use consolidation with different consolidation scales.

FIG. 3 is a preferred embodiment of the trading screen of FIG. 1 configured for three display regions in which two of the display regions use consolidation with different consolidation scales. The trading screen depicted in FIG. 3 includes the first display region 108, the second display region 110, and the third display region 112. In this embodiment, the second and third display regions 110, 112 are each formed by consolidating a different number of price levels. The price levels in the second display region 110 are formed by combining four price levels into a single consolidated price level, and the price levels in the third display region 112 are formed by combining two price levels into a single consolidated price level.

By using different scales in the second and third display regions 110, 112, the trader may be able to see different ranges of price levels above and below those displayed in the first display region 108. As the second display region 112 consolidates more price levels than the third display region 110, the trader is able to see information formed from more un-consolidated price levels above the first display region 108 than below the first display region 108. The range of un-consolidated price levels combined into the second and third display regions 110, 112 may be varied based on the scale used by the second and third display regions 110, 112. Combining four and two rows respectively for the second and third display regions 110, 112 is merely an example, and other scales may be used as well.

FIG. 4 is a preferred embodiment of the trading screen of FIG. 1 configured for three display regions in which each of the display regions uses consolidation and in which each of the display regions uses a different consolidation scale. FIG. 4 also depicts the first display region 108, the second display region 110 and the third display region 112. As shown in FIG. 4, each of the first, second and third display regions 108, 110, 112 combine two or more price levels to form consolidated price levels, which are then displayed in their respective display regions.

Thus, in this display, the price levels in the first display region 108 around the inside market are consolidated price levels formed by combining two of the price levels shown in FIG. 1. However, consolidating two price levels is merely an example, and any number of price levels may be combined to form the consolidated price levels in the first display region 108. The second and third display regions 110, 112 each include consolidated price levels. The second display region 110 is formed by combining four price levels, while the third display region 112 is formed by combining eight price levels. In alternate embodiments, the number of un-consolidated price levels combined to form the consolidated price levels may be the different for the second and third display regions 110, 112, or the second or third display regions 110, 112 may not use consolidation at all.

FIG. 5 is a preferred embodiment of the trading screen of FIG. 1 configured for four display regions in which three of the display regions use consolidation. FIG. 5 depicts the first, second and third display regions 108, 110, 112, and in addition to these regions it also displays a fourth display region 114. The fourth display region 114 displayed in FIG. 5 is located above the second display region 110, but it should be understood that the fourth display region 114 may be located at any position on the trading screen. The fourth display region 114 may be configured, for example, to have a different scale than the second display region, thereby differentiating the fourth display region 114 from the adjacent second display region 110.

In a preferred embodiment, as shown in FIG. 5, the fourth display region 114 may use a larger scale than the second display region, thereby allowing the trading screen to display information for even a greater number of price levels away from the inside market. Thus, the resolution of the price levels may decrease further away from the inside market. For example, the first display region 108 may have the greatest resolution by not consolidating any price levels or by combining only a small number of price levels into each consolidated price level. The resolution may then decrease in the second display region 110, which may combine a greater number of price levels than was used by the first display region 108 to form the consolidated price levels. The fourth display region 114 may then also combine a greater number of price levels to form its consolidated rows that was used by the second display region 110, thereby giving the fourth display region 114 a lower resolution than the second display region 110. It is not necessary, however, that the consolidation resolution decrease away from the inside market. Rather, any combination of arbitrary consolidation resolutions, or no consolidation at all, may be used for the different display regions 108, 110, 112, 114.

The display regions 108, 110, 112, 114, in the various trading screen embodiments may be configured by a user. For example, the trading application may be preprogrammed with a default configuration, which may be used when the trading application initially displays the trading screen. The default configuration may also be changed by the user. Once the trading screen is displayed to the user, the user may further reconfigure the trading screen, such as by adding or removing display regions or by changing various properties of one or more of the display regions 108, 110, 112, 114.

The user may add or remove display regions in a variety of different ways. In one embodiment, the trading screen may display one or more configuration screens in which the user may manually enter information to configure the number and location of the display regions. For example, the user may enter a number of regions to be displayed on the trading screen, and the user may further enter beginning and ending price levels for the display regions. The ranges specified by the user may be static and thus not change based on the movement of the inside market, or alternatively the ranges specified by the user may dynamically change based on the movement of the inside market. The trader may also use the configuration screens to remove one or more of the display regions.

In another embodiment, the user may configure the number and location of the display regions directly from the trading screen. For example, the user may select a beginning price level and ending price level for a display region. This may be done, for instance, using a mouse or other input device. Using the input device, the trader may select a beginning price level for the display region, such as by clicking a mouse button on the beginning price level in combination with one or more other keys. The trader may then also select an ending price level for the display region, such be clicking a mouse button on the ending price level in combination with one or more other keys. Once the user makes the selection of the beginning and ending price levels, the trading application may responsively create and display the display region. The trader may similarly remove a display region, such as by clicking on a point within the display region in combination with one or more other keys.

In another embodiment, the trader may configure a display region by using an input device to highlight one or more price levels. For example, the trader may use the input device to click on a beginning price level, perhaps also in combination with one or more other keys, and then drag the input device to an ending price level. Once the trader has selected the price levels in the manner, the trading application may responsively create a display region in the area selected by the user. These methods of creating a display region are merely examples, and many other ways of selecting a range of price levels to create a display region also exist.

Once the user has created a display region, the user may configure various properties for the display region. For example, the user may specify whether the display region remains fixed with respect to a particular range of prices or whether the display region may dynamically change price levels, such as in response to a change in position of the inside market. In another example, the regions may be color-coded, such as by using different colors to correspond to the different consolidation scales used by the various display regions. The user may select the colors corresponding to the different display regions directly, or the user may associate different colors with different scales that are then used automatically by the trading application depending on the chosen scale for the display regions.

In another example, the user may configure the scale of the display region, such as by specifying a number of un-consolidated price levels to be combined into consolidated price levels for the display region. Alternatively, the user may select the scale such that no price levels are combined to form a consolidated price level in the display region.

The user may adjust the scale of a display region in a variety of different ways. In one embodiment, as previously described, the user may use a configuration screen to enter information for the display region, such as the scale of the display region. In a preferred embodiment, the trading screen displays one or more adjustable features, which may be used to set the scale of a display region. The adjustable features may take many different forms. For example, an adjustable feature may be text box, in which the user may type a scale for the display region. For instance, by entering "2" into the text box, the user may specify that two unconsolidated price levels should be combined to form a single consolidated price level. The text box may include selection arrows, such as can be selected using an input device in order to adjust the value displayed in the text box up or down without requiring the user to manually type a value into the text box.

In another example, an adjustable feature may be a slideable bar. Once such implementation of a slideable bar used for price consolidation is described in the "Trading Tools for Electronic Trading" application. The slideable bar may be adjusted between two endpoints, such as by using a mouse or other input device. The position of the slideable bar may then determine the scale used for a display region. For example, one endpoint may correspond to a first scale for the display region, and the second endpoint may correspond to a second scale for the scale region. Intermediate points between the first and second endpoints may then correspond to scales between the first and second scale. While the scales corresponding to the endpoints, as well as the number of intermediate points between the endpoints, may be set to a default values, these parameters may also be adjust by the user, for example, through a configuration screen.

In one preferred embodiment, the trading screen displays a separate adjustable feature for each display region. This may allow a user to easily adjust the scale of any of the display regions on the trading screen without having to enter a separate configuration screen. In another preferred embodiment, the trading screen displays a single adjustable feature for corresponding to one or more of the display regions.

Figure 6:
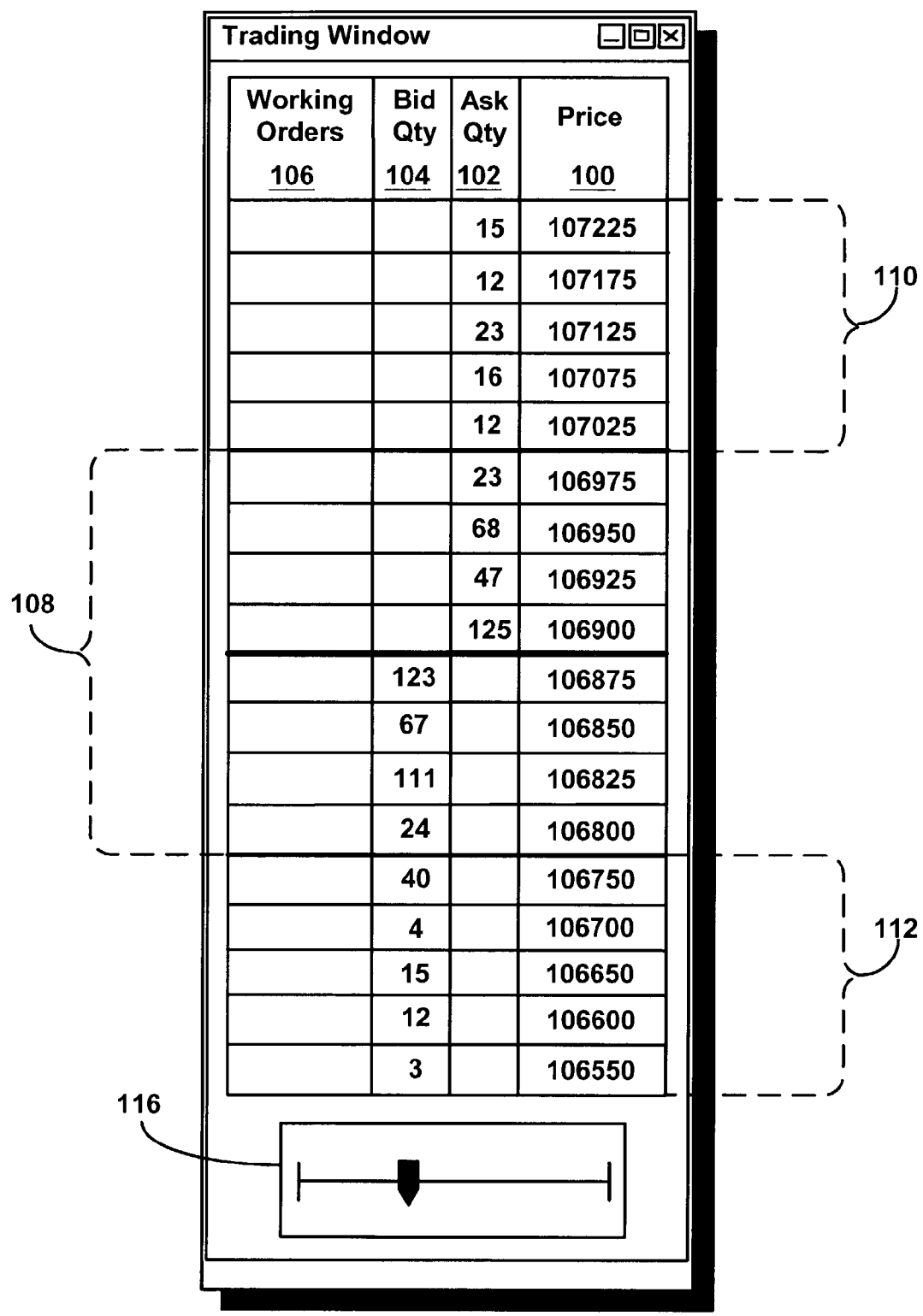
FIG. 6 is a preferred embodiment of the trading screen of FIG. 2 configured with a single adjustable feature for changing the consolidation scale of the display regions.

FIG. 6 is a preferred embodiment of the trading screen of FIG. 2 configured with a single adjustable feature for changing the consolidation scale of the display regions. The trading screen depicted in FIG. 6 includes an adjustable feature 116, which may be used to change the scale of the display regions 108, 110, 112. Thus, the user may use the adjustable feature 116 to alter the number of price levels that are combined in order to form a consolidated price level in a particular display region 108, 110, 112. The user may select a display region 108, 110, 112, such as by clicking on the display region 108, 110, 112 in combination with one or more other keys. The user may then adjust the scale of the display region using the adjustable feature 116. After selecting another display region 108, 110, 112, the user may then use the same adjustable feature 116 to adjust the scale of the other display regions. In another embodiment, the adjustable feature 116 may be used to simultaneously adjust the scale of more than one display region, such as by making a proportional change in scale to each of the display regions in response to an adjustment of the adjustable feature 116.

In addition to configuring appearance of the display regions 108, 110, 112, the user may additionally configure trading options for the display regions 108, 110, 112. The user may, for example, place trades directly from the display screen, such as by using a mouse or other input device to select a cell in the ask quantity column 102 or the bid quantity column 104. The user may additionally specify a quantity, or the user may have pre-specified a default quantity for order placed from the trading screen. When using a default quantity, the trading application may automatically submit the user's order upon selecting one of the cells in the ask or bid quantity columns 102, 104, or alternatively, the trading application may wait for the user to take an additional action. The order may then be submitted at the price corresponding to the selected cell.

The selected cell, however, may correspond to a consolidated price level. So, an order placed at a consolidated price level may in fact be placed at one or more of the price levels that are combined to form the consolidated price level. Thus, the user may also configure how the trading application handles orders at consolidated price levels, such as by specifying at which of the non-consolidated price levels an order is submitted. Various different methods may be used to handle orders at consolidated price levels. For example, the trading application may submit a limit order at the consolidated price level, or the trading application may submit a limit order at one of the other un-consolidated price levels making-up the consolidated price level. In another example, the order quantity may be split among one or more of the un-consolidated price levels making-up the consolidated price level, such as in an equal distribution or in any other possible combination. The distribution among these price levels may be, for example, specified by the user.

In another embodiment for placing orders, the trader may select a consolidated price level, such as by clicking on the price or quantity information for the consolidated price level. Instead of automatically placing a trade using one of the previously described methods, the trading screen may open another window showing the un-consolidated price and quantities corresponding to the selected consolidated price level. Trader may then, for example, click in the quantity fields for one or more of the un-consolidated price levels in order to place orders in the normal fashion. The trader may then close the window after placing a trader, or they window may close automatically after the trader places a trade.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A computer-implemented method for displaying market information on a trading screen, the method comprising:
    receiving by a computing device market information for a tradeable object from an electronic exchange;
    generating by the computing device a plurality of price levels along a static axis of prices, the plurality of price levels pertaining to the market information for the tradeable object;
    consolidating by the computing device a first portion of the plurality of price levels along the static axis of prices, wherein every two or more price levels of the first portion are grouped into a consolidated price level, and wherein the step of consolidating the first portion of the plurality of price levels results in a plurality of consolidated price levels;
    consolidating by the computing device quantity indicators for the every two or more price levels of the first portion into a consolidated quantity indicator, wherein the consolidated quantity indicator corresponds to the consolidated price level, and wherein the step of consolidating the quality indicators for every two or more price levels of the first portion of the plurality of price levels results in a plurality of consolidated quantity levels;
    displaying by the computing device the plurality of consolidated price levels for the first portion of the plurality of price levels along the static axis of prices;
    displaying by the computing device the plurality of consolidated quantity indicators for the first portion of the plurality of price levels along the static axis of prices in alignment with the plurality of consolidated price levels;
    displaying by the computing device a second portion of the plurality of price levels along the static axis of prices without consolidation, wherein the first portion and the second portion align to form the static axis of prices; and
    displaying by the computing device quantity indicators for the second portion of the plurality of price levels in the static axis of prices in alignment with the second.

2. The method of claim 1, further comprising:
    consolidating a third portion of the plurality of price levels along the static price axis, wherein every two or more price levels of the third portion are grouped into a consolidated price level, and wherein the step of consolidating the third portion of the plurality of price levels results in a second plurality of consolidated price levels;
    displaying the second plurality of consolidated price levels for the third portion of the plurality of price levels along the static price axis, wherein the first, second, and third portion align to form the static axis of prices; and
    displaying consolidated quantity indicators for the third portion of the plurality of price levels along the static axis of prices in alignment with the second plurality of consolidated price levels.

3. The method of claim 2, wherein the consolidated quantity indicators for the first and third portion are each formed by combining a different number of un-consolidated price levels.

4. The method of claim 1, wherein the second portion of the plurality of price levels in the static axis of prices includes an inside market, and wherein the second portion of the plurality of price levels dynamically changes based on the movement of the inside market.

5. The method of claim 1, wherein a number of the plurality of price levels in the first portion are configurable by a user, and wherein a number of plurality of price levels in the second portion are configurable by a user.

6. The method of claim 1, further comprising:

consolidating the second portion of the plurality of price levels along the static price axis, wherein every two or more price levels of the second portion are grouped into a consolidated price level, and wherein the step of consolidating the second portion of the plurality of price levels results in a third plurality of consolidated price levels, displaying the third plurality of consolidated price levels for the second portion of the plurality of price levels along the static price axis, wherein the first portion and the second portion align to form the static axis of prices; and displaying consolidated quantity indicators for the second portion of the plurality of price levels along the static axis of prices in alignment with the third plurality of consolidated price levels.

7. A computer readable medium having stored therein instructions for execution on a computer, the instructions causing a machine to perform the following method steps:

receiving by a computing device market information for a tradeable object from an electronic exchange;

generating by the computing device a plurality of price levels along a static axis of prices, the plurality of price levels pertaining to the market information for the tradeable object;

consolidating by the computing device a first portion of the plurality of price levels along the static axis of prices, wherein every two or more price levels of the first portion are grouped into a consolidated price level, and wherein the step of consolidating the first portion of the plurality of price levels results in a plurality of consolidated price levels;

consolidating by the computing device quantity indicators for the every two or more price levels of the first portion into a consolidated quantity indicator, wherein the consolidated quantity indicator corresponds to the consolidated price level, and wherein the step of consolidating the quality indicators for every two or more price levels of the first portion of the plurality of price levels results in a plurality of consolidated quantity levels;

displaying by the computing device the plurality of consolidated price levels for the first portion of the plurality of price levels along the static axis of prices;

displaying by the computing device the plurality of consolidated quantity indicators for the first portion of the plurality of price levels along the static axis of prices in alignment with the plurality of consolidated price levels.

* * * * *

UNITED STATES PATENT AND TRADEMARK OFFICE
CERTIFICATE OF CORRECTION

| | | |
|---|---|---|
| PATENT NO. | : 7,577,602 B2 | Page 1 of 1 |
| APPLICATION NO. | : 10/304248 | |
| DATED | : August 18, 2009 | |
| INVENTOR(S) | : Singer | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 1442 days.

Delete the phrase "by 1442 days" and insert -- by 1769 days --

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,577,602 B2  
APPLICATION NO. : 10/304248  
DATED : August 18, 2009  
INVENTOR(S) : Scott Singer Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2096 days.

Signed and Sealed this

Seventh Day of September, 2010

David J. Kappos  
*Director of the United States Patent and Trademark Office*